United States Patent [19]

Guthrie et al.

[11] 4,439,553

[45] Mar. 27, 1984

[54] HIGH MOLECULAR WEIGHT AROMATIC AMINE SCAVENGERS AND METHOD OF USE

[75] Inventors: James L. Guthrie, Ashton; Clifton L. Kehr, Silver Spring, both of Md.

[73] Assignee: W. R. Grace & Co., New York, N.Y.

[21] Appl. No.: 458,434

[22] Filed: Jan. 17, 1983

[51] Int. Cl.$^3$ ............................................. C08G 18/14
[52] U.S. Cl. ..................................... 521/159; 252/182; 521/905; 528/59; 560/1; 560/25; 560/158
[58] Field of Search ................ 252/182; 521/159, 905; 528/59; 560/1, 25, 158

[56] References Cited

U.S. PATENT DOCUMENTS 3,094,495  6/1963  Gemeinhardt ...................... 521/159
4,381,332  4/1983  Fulmer et al. ......................... 528/59

*Primary Examiner*—Maurice J. Welsh
*Attorney, Agent, or Firm*—Richard P. Plunkett; William W. McDowell, Jr.

[57] ABSTRACT

This invention relates to hydrophilic, urethane-forming compositions and a method of forming polyurethanes having low residual, potentially carcinogenic, aromatic amines by adding scavengers comprising polyols endcapped with aliphatic polyisocyanates.

12 Claims, No Drawings

HIGH MOLECULAR WEIGHT AROMATIC AMINE SCAVENGERS AND METHOD OF USE

BACKGROUND OF THE INVENTION

1. Field of the Invention

This invention relates to aromatic amine scavengers for use in hydrophilic polyurethanes. More particularly, it is directed to scavengers comprising polyols end-capped with aliphatic polyisocyanates.

Recently it was discovered that polyurethane foams contain aromatic amines. Recent evidence has also tended to indicate that certain aromatic amines may represent a health hazard. Although the formation of the aromatic amines is not understood completely, it appears that aromatic isocyanates and possibly their reaction products containing urea and urethane linkages are hydrolyzed to produce free aromatic amines which can be leached from the polyurethane foam. On the other hand, aliphatic isocyanates due to their low reaction rate do not compete successfully with the aromatic isocyanate for functional groups during the polymerization reaction. Therefore, the aliphatic isocyanate scavenger survives polymerization and is thus capable of forming urea addition products with aromatic amines as these are produced. However, aliphatic isocyanates, per se, have the drawback of having a high vapor pressure (boiling ranges of 200–250° C.) so that they lack permanence and may cause unpleasant odors. Additionally, said high vapor pressure drawback also requires that the aliphatic isocyanates be added in relatively large amounts to insure that sufficient is present to react with the aromatic amine after the foaming and drying or postcuring operations.

2. Description of Previously Published Art

Applicants are aware of certain prior art believed to be relevant. Specifically, British Patent No. 1,368,625 describes preparation of polyurethane foams wherein from 1 to 20% by weight of an aliphatic polyisocyanate is employed in combination with conventional polyurethane foam reagents. The function of the aliphatic polyisocyanate appears to be to enhance formation of a dense integral skin during molding of the polyurethane foam. The aliphatic isocyanate is also said to contribute greatly to non-yellowing of the foam.

U.S. Pat. No. 3,790,508 describes light-stable polyurethane foams prepared by reacting a polyol, an aliphatic isocyanate, an aromatic isocyanate, a blowing agent and a catalyst. The aliphatic isocyanate index employed is from about 5 to about 40.

British Patent No. 1,323,955 also describes formulations containing a mixture of aromatic and aliphatic isocyanates, water and a catalyst to cause trimerization of the aromatic isocyanate. The resulting foams are said to possess good physical properties as well as flame-resistance.

In the three aforestated prior art processes the aliphatic diisocyanate reacts to form part of the foam during the foaming reaction.

U.S. Pat. No. 4,211,847 teaches a method of scavenging aromatic amines in polyurethane foams by the use of scavengers selected from the group consisting of cyclohexyl monoisothiocyanates and hindered cycloaliphatic monoisocyanates. However, these scavengers, because of their relatively high vapor pressure, must be employed in relatively large amounts to insure that sufficient scavenger is still present after the foaming and drying to react with the aromatic amine.

3. Objects of the Invention

One object of the instant invention is to produce a class of scavengers for aromatic amines in polyurethanes. Another object of the invention is to produce a class of scavengers for aromatic amines which have low vapor pressures. A further object of the instant invention is to produce a class of scavengers whicn have reduced reactivity towards water and are compatible with the foaming mixture. Other objects will become apparent from a reading hereinafter.

SUMMARY OF THE INVENTION

Aromatic amines can be scavenged from polyurethane foams by the addition of a class of scavengers comprising polyols end-capped with aliphatic polyisocyanates. The scavengers form urea addition products with the aromatic amines which addition products do not represent a potential health hazard.

DESCRIPTION OF THE PREFERRED EMBODIMENTS

The present invention arises from the discovery that polyurethane foams contain residual aromatic amines believed to result from hydrolysis of aromatic isocyanates during and subsequent to the foaming process and possibly due to hydrolysis of the foam during extended storage. For example, both one shot and prepolymer foams employing toluene diisocyanate have been found to contain the corresponding amine, e. g., toluene diamine (TDA). Foams employing other aromatic polyisocyanates will also contain the corresponding polyamine, and thus the invention is likewise applicable to these foams. To reduce the amount of aromatic amine, a "scavenger" is introduced prior to foaming, said scavenger being a material which can survive the foaming reaction, to thereafter react with aromatic amines as they are generated.

It has been discovered that at least a stoichiometric amount, sufficient to react with any aromatic amines present, of an amine scavenger comprising polyols end-capped with aliphatic polyisocyanates when added to a hydrophilic urethane prepolymer system results in polyurethane foams having a low residue of aromatic amines.

Herein the above polyols end-capped with aliphatic polyisocyanates will be referred to as aromatic amine scavengers or scavengers.

The amount of aromatic amine scavengers added to the system is in the range 0.01 to 5 parts by weight based on the weight of the prepolymer used to form the polyurethane. Tne lower limit on the amount of aromatic amine scavengers present is not critical but is determined by the degree of scavenging activity desired.

As used herein, the term "aromatic amines" relates to amines formed from any of various well known aromatic isocyanates used to form polyurethanes; however, for purposes of brevity the invention will be explained and exemplified using toluene diisocyanate as the precursor for toluene diamine since this material is the most widely used commercially. Obviously, other well known and commercially available aromatic isocyanates form aromatic amines when used to form polyurethanes including, but not limited to, PAPI (a polyaryl polymethylenepolyisocyanate as defined in U.S. Pat. No. 2,683,730), triphenylmethane-4,4',4''-triisocyanate, benzene-1,3,5-triisocyanate, toluene-2,4,6- triisocyanate, diphenyl-2,4,4'-triisocyanate, xylene diisocyanate, m-phenylene diisocyanate, cumene-2,4-diisocyanate, chlorophenylene diisocyanate, diphenylmethane-4,4'-diisocyanate, naphthalene-1,5-diisocyanate, xylene-alpha, 3,3'-dimethyl-4,4'-biphenylene diisocyanate, 3,3'-dimethoxy-4,4'-biphenylene diisocyanate, 2,2',5,5'-tetramethyl-4,4'-biphenylene diisocyanate, 4,4'-methylene-bis(phenylisocyanate), 4,4'-sulfonylbis (phenylisocyanate), 4,4'-methylene diorthotolylisocyanate, 2,4-diisocyanatodiphenylether and the like. Mixtures of any one or more of the above mentioned aromatic isocyanates may be used to form polyurethane foams or elastomers as desired. The low residue foams produced according to the present invention can be rigid, semi-rigid or flexible.

It should be quite apparent to one skilled in the art that not all isocyanates are operable as scavengers in the instant invention. That is, when one adds, e.g., a polyol end-capped with an aliphatic isocyanate as a scavenger, to an aromatic isocyanate prepolymer to form a polyurethane, obviously the water reactant will, if possible, react with the aliphatic isocyanate as well as the aromatic isocyanate, e.g., toluene diisocyanate, to form the polyurethane. Thus, it is critical in the instant invention that, when the aromatic amine scavenger is a polyol end-capped with an aliphatic isocyanate, it must have a considerably lower reaction rate with water than the aromatic isocyanate. That is, the aromatic isocyanate must react substantially completely with water to form the polyurethane before the aliphatic isocyanate can effect a competing reaction. Thus, aliphatic isocyanates having substantially the same reaction rate as aromatic isocyanates with a polyol or water would not be available to scavenge the later formed aromatic amines. To properly act as an aromatic amine scavenger, the scavenger herein should exhibit a reaction rate with water which is less than $10^{-2}$ times the reaction rate of the aromatic isocyanate with water and preferably $10^{-3}$–$10^{-7}$.

Other factors which are important in reducing the level of aromatic amines and optimizing the effect of the aromatic amine scavengers include the following. Polyurethane foams which are stored while still wet tend to exhibit a higher level of aromatic amines than corresponding foams stored following dryings. Thus, higher percentages of aromatic amine scavengers have to be added to these materials to obtain allowable residues of aromatic amines. Additionally, the use of certain catalyst in the foaming reaction have been found to be detrimental, i.e., it is preferred that any catalyst employed be a "mild" catalyst which promotes reaction between the aromatic isocyanate and hydroxyl groups of the polyol and permits the foaming reaction to proceed at a reasonable rate but does not cause undesirable side reactions consuming the aromatic amine scavenger. If conventional strong catalyst (e. g., tin salts) are employed, the amount thereof should be reduced.

The aromatic amine scavenger system disclosed herein is believed to be operable with all presently known polyurethane foaming systems including the one shot method and hydrophobic prepolymer method. In these systems the polyols used are polyester or hydrophobic polyethers to make the scavenger more compatable with the polyurethane forming formulation. Additionally, it is operable in the more recently known method for forming hydrophilic polyurethane foam from hydrophilic prepolymers as will be more fully discussed hereinafter.

The methods forming polyurethanes supra are conventional, well known in the art and form no part of this invention. The one shot (see, for example, U.S. Pat. No. 3,790,508 and British Patent No. 1,368,625) and hydrophobic prepolymer (including semiprepolymer) methods are well documented, e.g., see Kirk-Othmer, Encyclopedia of Chemical Technology, 2nd Ed., Vol. 12, pp. 45–50, and Vol. 9, pp. 853–855. The method of forming polyurethane foams from hydrophilic prepolymers is taught in U.S. Pat. No. 4,137,200. Briefly stated, in the one-shot process all the necessary individual ingredients for producing the foam are mixed together in substantially stoichiometric amounts and then discharged from the mixer onto a suitable surface. The reactions being immediately and proceeding at such a rate that expansion starts in about 10 seconds; the entire expansion is completed in 1 or 2 minutes. The completion of the curing may take several days.

In the hydrophobic prepolymer process the polyhydroxy component is reacted with enough polyisocyanate to result in formation of a prepolymer with isocyanate end groups plus excess isocyanate (where R' is typically a polyether structure containing less than 40 mole % oxyethylene units but can also be a polyester):

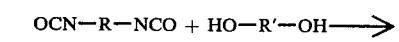

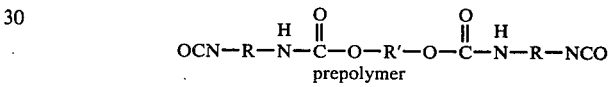
prepolymer

The prepolymer mixture is then reacted with a stoichiometric amount of water in the presence of a catalyst to simultaneously release carbon dioxide for expansion and link the chains together into a crosslinked matrix. This method is most often used for flexible foams.

In a "semiprepolymer process" which has become more extensively used for forming rigid foams, a prepolymer containing excess isocyanate is mixed with more polyhydroxy resin and a separate blowing agent such as halocarbon. In this case the prepolymer may contain only a few percent of the total polyhydroxy resin.

A preferred embodiment of the invention is the use of scavengers in the prepolymer method for preparing hydrophilic polyurethane foams, said method comprising foaming (under conventional conditions) a mixture comprising: (a) an aromatic amine scavenger and (b) a hydrophilic urethane prepolymer having polyether backbone segments capped with an aromatic isocyanate and wherein said aromatic amine scavenger is present in an amount less than or equal to about 5 parts by weight of said prepolymer. Preferably, the amount of scavenger is less than or equal to about 2 parts by weight of said prepolymer. The lower limit on the amount of scavenger present is not critical but is determined by the degree of scavenging activity desired and also by the nature of the scavenger. Generally, a level of not less than 0.01 parts should be employed.

In preparing foams by the hydrophilic prepolymer technique, the prepolymer is generally admixed with a suitable blowing agent (e.g., water), and other additives (e.g., fire retardants) depending on the ultimate end use. The amount of water employed can range from about 6.9 moles to about 390 moles of $H_2O$/mole of unreacted NCO groups.

In determining the amount of water added to form the polyurethane in any method disclosed herein, the "mole of NCO groups" refers to the NCO groups in the aromatic isocyanate remaining after reaction of the theoretical amount of the NCO groups in the aromatic isocyanate necessary to react with all the hydroxyl groups of the polyol have been used up.

SCAVENGER PREPARATION

The scavenger employed consists generally of polyether backbone segments capped with an aliphatic polyisocyanate (e.g., isophorone diisocyanate). Suitable aliphatic isocyanates include, but are not limited to, hexamethylene diisocyanate, DESMODUR® N a biuret trimer of hexymethylene diisocyanate, commercially available from Mobay Chemical, dicyclohexyl methane diisocyanate which is tradenamed DESMODUR® W, trimethyl hexamethylene diisocyanate and lysine diisocyanate. Suitable polyether polyols include, for example, the polyalkylene oxide ethers, such as the reaction products of ethylene oxide, propylene oxide, butylene oxide with a compound containing two or more reactive hydrogens, such as water, resorcinol, glycerol, trimethylolpropane, pentaerythritol, ethylene glycol, diethylene glycol, triethylene glycol and the like. The polyethers are further exemplified by compounds such as polyoxypropylene glycol, polyoxyethylene glycol, polyoxybutylene glycol, polyoxyethyleneoxypropylene glycol, polyoxyethyleneoxybutylene glycol and polyoxypropyleneoxybutylene glycol. To obtain hydrophilic scavengers, the polyols employed therein must contain at least 40 mole percent of oxyethylene units in the backbone with the balance being oxypropylene, oxybutylene or other oxyalkylene units. In the resulting scavenger the branch points of the chains are connected by essentially linear polyoxyalkylene chains containing at least 40 mole percent of oxyethylene units (excluding initiators at branch points). Preferably, the oxyethylene content is from about 60–75 mole percent. At oxyethylene levels of 40–60 mole percent, it may be desirable to use a surfactant known in the art to promote dispersion of the scavenger in water prior to foaming. Surfactants of the non-ionic class such as PLURONIC F-127 and the like are preferred, but it is also feasible to use ionic or amphoteric surfactants and surfactants based on silicon, phosphorous or fluorine containing compounds.

Suitable hydrophilic scavengers are prepared by reacting a polyoxyethylene containing polyol with twice the stoichiometric amount of an aliphatic polyisocyanate. For example, two moles of an aliphatic diisocyanate such as methylene bis(cyclohexylisocyanate) or isophorone diisocyanate with one mole of polyoxyethylene glycol. The polyol used herein should have a molecular weight in the range 300–10,000 and preferably 500–3,000. The hydroxy functionality of the polyol and the corresponding isocyanate functionality following capping is from 2 to about 4.

Examples of suitable polyols (to be capped with aliphatic polyisocyanates) and used as scavengers include: (A) essentially linear polyols formed for example by reaction of ethylene oxide with water, ethylene glycol or high molecular weight glycols as an initiator. As discussed above, mixtures of ethylene oxide with other alkylene oxides can be employed to form hydrophilic scavengers as long as the mole percent of ethylene is at least 40%. When the linear polyethers are mixtures of ethylene oxide with, e.g., propylene oxide, the polymer can be either a random or a block copolymer and the terminal units can be either oxyethylene or oxypropylene. A second class of polyols (B) includes those with a hydroxy functionality of three or more. Such polyols are commonly formed by reacting alkylene oxides with a polyfunctional initiator such as trimethylolpropane, pentaerythritol, etc. In forming the polyol B the alkylene oxide used can be ethylene oxide or mixtures of ethylene oxide with other alkylene oxides as described above. Useful polyols can be further exemplified by (C) a mixture of linear and branched polyfunctional polyols as exemplified in A and B above together or either A or B with a polyol containing at least three hydroxy terminal groups, e. g., trimethylolpropane. A specific example of C is a mixture of polyethylene glycol (mw about 1,000) with trimethylolpropane, trimethylolethane or glycerol. This mixture can be subsequently reacted with a stoichiometric amount of an aliphatic polyisocyanate to provide the scavenger useful in the instant invention. Alternatively, the linear polyol (e.g., polyoxyethylene glycol) can be reacted separately with a stoichiometric amount of an aliphatic isocyanate and the initiator, e.g., trimethylolpropane, can also be separately reacted with an aliphatic polyisocyanate. Subsequently, the two capped materials can be combined to form the scavenger. As aforestated, these hydrophilic scavengers have good compatibility with hydrophilic foams such as those taught in U.S. Pat. No. 4,137,200. Also, because of their higher molecular weight than the isocyanate per se, they have a lower vapor pressure and thus can be used in lesser amounts to scavenge the aromatic amines.

The general procedure for making the scavenger is to dry the diol or mixture of polyols by stirring at a temperature of 50°–70° C. under a reduced pressure of about 2–10 Torr, for 1 to 2 hours, or until the water content is less than about 0.1% by weight. The dried polyol component is then added all at once to the polyisocyanate component, and a reaction temperature of 50°–80° C. is maintained until the reaction is complete. This requires about 1 to 10 hours.

In general, poly(oxyethylene) diols near the lower end of the aforegiven molecular weight range are preferred for water solubility and higher isocyanate content of the scavenger. The reduced isocyanate reactivity of the scavenger with water is achieved in part because after one isocyanate function of the diisocyanate has reacted with the polyol, the reactivity of the remaining isocyanate group is reduced. For example, in the case of methylene-bis(cyclohexyl isocyanate), the decrease in reactivity with water is approximately three-fold.

It is within the scope of this invention to use triols or tetrols or mixtures of polyols such as diols, triols and tetrols although diols and mixtures of diols and triols are preferred in forming the scavengers herein. The amine scavenger is usually added to the hydrophilic prepolymer employed to form a foam. However, the amine scavenger can be added to the water if added just prior to admixing the water with the aromatic isocyanate-capped prepolymer.

The following examples are set out to explain, but expressly not limit, the instant invention. Unless otherwise noted, all parts and percentages are by weight.

The aromatic amine in the foam is measured by high performance liquid chromatography by the following procedure.

Place a four-gram sample of foam in a 250 ml beaker and add 70 ml of methylene chloride. The foam is allowed to soak for 5 minutes with occasional squeezing.

The methylene chloride is then decanted, squeezing the foam to remove the methylene chloride as thoroughly as possible. This extraction step is repeated and the combined extracts are heated to reduce the volume to approximately 20 ml. The concentrated extract is placed in a 25 ml glass vial with a screw cap. 2 ml of 0.1 N HCl are added. The vial is capped and shaken for one minute. Allow the vial to stand until the phases separate. The upper (aqueous) phase is used for analysis.

The analyses are done by high performance liquid chromatography (HPLC) using a reverse phase C-18 column. The mobile phase used is a mixture of 24% acetonitrile and 76% aqueous phase composed of 13.8 grams of monobasic sodium phosphate monohydrate per liter. The flow rate is 4 ml/minute. An ultraviolet absorbance detector is used at a wavelength of 254 nm.

TDA standards for preparation of a calibration curve are prepared by weighing 50 mg of TDA into a 100 ml volumetric flask and filling to the mark with methanol. Serial dilutions are made to cover the concentration range of interest. Inject 25 microliter aliquots of the standards and plot TDA concentrations (micrograms/ml) vs. TDA peak heights.

Inject 25 microliters of the aqueous phase from the 5 ml glass vial. Measure the TDA peak height and read the concentration from the calibration curve. Calculate ppm TDA in the foam as follows:

$$\frac{\text{Concentration of } TDA \text{ in aq. phase (micrograms/ml)} \times 2 \text{ (ml)}}{\text{Foam Weight (grams)}}$$

EXAMPLE 1

Preparation of Foaming Hydrophilic Prepolymer

A prepolymer was prepared by admixing 2 molar equivalents of polyethylene glycol having an average molecular weight of 1,000 (PEG - 1,000) and 0.66 molar equivalent of trimethylolpropane (TMOP). The admixture was dried at 100°-110° C. under a pressure of 5-15 Torr to remove water. The resulting dried mixture was slowly added over a period of about one hour to a vessel containing 5.70 molar equivalents of toluene diisocyanate (TDI) while stirring the TDI and polyol mixture. The temperature was maintained at 60° C. The mixture was maintained at 60° C. with stirring for three additional hours. The final reaction mixture of the polyols end-capped with an aromatic diisocyanate contained a 5% molar deficiency of TDI.

EXAMPLE 2

Preparation of Hydrophilic Aromatic Amine Scavenger 3 moles of polyethylene glycol having an average molecular weight of 1,000, commercially available from Union Carbide under the tradename "CARBOWAX® 1,000", and 1 mole of trimethylol propane were admixed and the admixture was dried at 100°-110° C. under a pressure of 5-15 Torr to remove water. The admixture was added to 9 moles of isophorone diisocyanate with stirring while the temperature was maintained at 70° C. After 8 hours the resultant aliphatic isocyanate end-capped polyols had an isocyanate content of 2.1 milliequivalents per g.

EXAMPLE 3

500 g of the foamable prepolymer from Example 1 were admixed with 5 g of the scavenger product from Example 2. 80 g of this admixture was added to 100 ml of a 2% aqueous solution of a non-ionic polyether based surfactant, sold under the tradename "Pluronic L-62" by BASF-Wyandotte in a Waring blender with agitation for 15 seconds. The admixture was then poured into a paper cup and allowed to foam. After 5 minutes the foam was removed from the paper cup and allowed to dry for 24 hours in air. The thus dried foam contained less than 50 parts per billion of toluene diamine on analysis.

In a control run using the same foaming prepolymer except that no scavenger was added, the resultant foam contained 190 parts per billion of toluene diamine.

We claim:

1. A process for scavenging aromatic amines from polyurethane foams produced from aromatic polyisocyanates which comprises adding a scavenger consisting essentially of at least one polyol end-capped with an aliphatic polyisocyanate.

2. The process according to claim 1 wherein the scavenger is a mixture of polyols each end-capped with an aliphatic polyisocyanate.

3. The process according to claim 1 wherein the scavenger is polyoxyethylene glycol end-capped with isophorone diisocyanate.

4. The process according to claim 1 wherein the scavenger is a mixture of polyoxyethylene glycol and trimethylolpropane each end-capped with isophorone diisocyanate.

5. A mixture for preparing hydrophilic polyurethane foams having a reduced aromatic amine content comprising an admixture of
(a) a hydrophilic urethane-containing prepolymer having polyether backbone segments end-capped with an aromatic isocyanate;
(b) 0.01 to 5% by weight of said (a) of an aromatic amine scavenger consisting essentially of at least one polyol end-capped with an aliphatic polyisocyanate; and
(c) 6.9 to 390 moles of water/moles of reactive NCO groups in said aromatic polyisocyanate.

6. The mixture according to claim 5 wherein the scavenger is a mixture of polyols each end-capped with an aliphatic polyisocyanate.

7. The mixture according to claim 5 wherein the scavenger is polyoxyethylene glycol end-capped with isophorone diisocyanate.

8. The mixture according to claim 5 wherein the scavenger is a mixture of polyoxyethylene glycol and trimethylolpropane each end-capped with isophorone diisocyanate.

9. A crosslinked, hydrophilic foam having a three-dimensional network comprising the reaction product of
(a) a hydrophilic urethane-containing prepolymer having polyether backbone segments end-capped with an aromatic isocyanate;
(b) 0.01 to 5% by weight of said (a) of an aromatic amine scavenger consisting essentially of at least one polyol end-capped with an aliphatic polyisocyanate; and
(c) 6.9 to 390 moles of water/moles of reactive NCO groups in said aromatic polyisocyanate.

10. The hydrophilic foam according to claim 9 wherein the aromatic amine scavenger is a mixture of polyols each end-capped with an aliphatic polyisocyanate.

11. The hydrophilic foam according to claim 9 wherein the aromatic amine scavenger is polyoxyethylene glycol end-capped with isophorone diisocyanate.

12. Tne hydrophilic foam according to claim 9 wherein the aromatic amine scavenger is a mixture of polyoxyethylene glycol and trimethylolpropane each end-capped with isophorone diisocyanate.

* * * * *